Figures 1, 2:
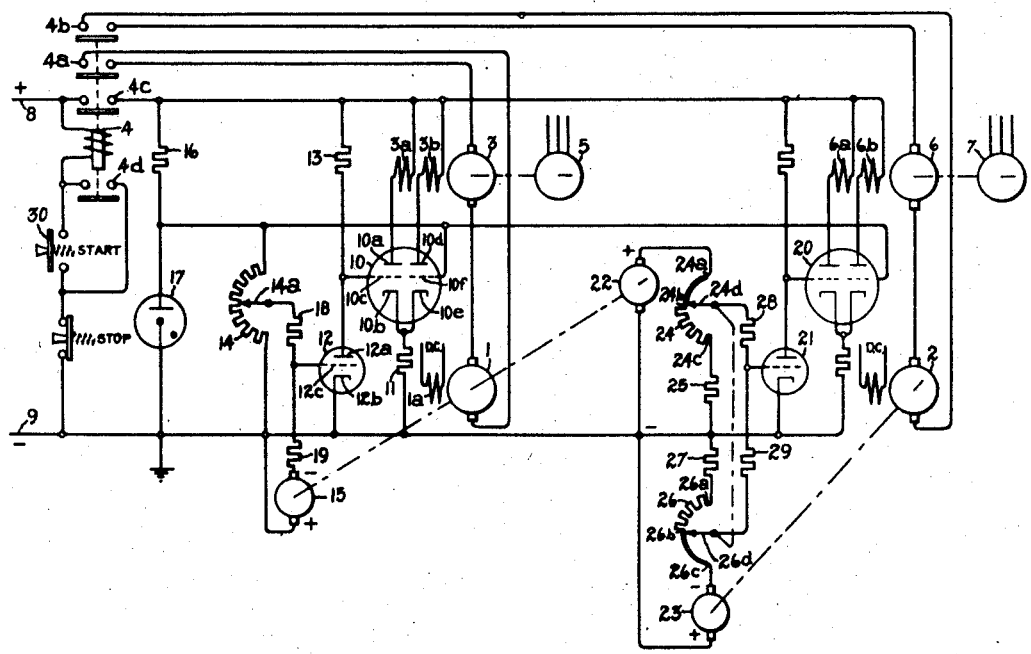

June 8, 1948.   R. D. McCOMB   2,443,048
SPEED RATIO CONTROL
Filed March 30, 1946

Inventor:
Robert D. McComb,
by *Claude H. Mott*
His Attorney.

Patented June 8, 1948

2,443,048

UNITED STATES PATENT OFFICE 2,443,048

SPEED RATIO CONTROL

Robert D. McComb, Schenectady, N. Y., assignor to General Electric Company, a corporation of New York Application March 30, 1946, Serial No. 658,421

7 Claims. (Cl. 318—67)

1

This invention relates to control systems, more particularly to systems for controlling the operations of electric motors and it has for an object the provision of a simple, reliable, and improved control system of this character.

More specifically the invention relates to systems for controlling the ratio of the speeds of two motors utilizing tachometer generators driven by the motors for producing control voltages proportional to the speeds of the motors, and a more specific object of the invention is the provision of a control which will cover the entire range of ratios required and use the maximum voltage obtainable from each generator.

In carrying the invention into effect in one form thereof, a first tachometer generator which is driven by one of the motors produces a control voltage proportional to speed. Similarly, a second tachometer generator driven by the other of the motors produces a control voltage proportional to speed. A separate potentiometer is connected across the terminals of each of the tachometer generators. One half of each of the potentiometers is a relatively high resistance and the other half is relatively low resistance or good conductor. Each of the potentiometers is provided with a slider. The sliders are connected together so that when both are moved, the entire voltage of either of the potentiometers and a portion of the voltage of the other are selected for comparison. The difference of the entire voltage of the one and the selected portion of the voltage of the other is utilized to control the speed of the second motor to equalize the selected fractional voltage with the entire voltage.

For a better and more complete understanding of the invention, reference should now be had to the following specification and to the accompanying drawing of which Fig. 1 is a simple, diagrammatical sketch of an embodiment of the invention, and Fig. 2 is a simple, diagrammatical sketch of a modification.

Referring now to the drawing, it is desired to maintain a preselected ratio between the speeds of the motors 1 and 2.

The motor 1 is supplied from a suitable source such as the adjustable voltage generator 3 with the armature of which the armature of the motor is connected in a series loop circuit through the contacts 4a of a line contactor 4. The motor 1 is provided with a suitable field winding 1a which is excited from a suitable source. As shown, the generator 3 is driven at a speed which is preferably substantially constant by suitable driving means such as an induction motor 5.

2

Similarly, the motor 2 is supplied from a generator 6, with the armature of which the armature of the motor is connected in a series loop circuit through the contacts 4b of the line contactor 4. This generator is likewise driven at a substantially constant speed by suitable means such as the induction motor 7. Alternatively, a single large induction motor may be utilized to drive both generators 3 and 6.

The generator 3 is provided with two opposed field windings 3a and 3b which are excited from a suitable D.-C. source such as is represented by the two supply lines. For the purpose of controlling the polarity and magnitude of the net excitation of the generator, suitable electric valve means 10 is provided. This electric valve means is a double triode valve having two conducting paths of which the first comprises anode 10a, cathode 10b and control grid 10c and the other comprises anode 10d, cathode 10e, and control grid 10f. The valve 10 is connected across the source 8 and 9 with the generator field winding 3a connected in the left-hand conducting path and the field winding 3b in the right-hand conducting path. A common cathode resistor 11 is connected between both cathodes and the negative supply conductor 9.

The grid to cathode voltage of valve 10 is controlled by means of a suitable auxiliary electric valve 12 which is preferably a triode valve of which the anode 12a is connected through a voltage dropping resistor 13 to the positive supply conductor 8 and the cathode 12b is connected to the negative supply conductor. Thus the grid to cathode voltage of valve 10 is controlled by the voltage drop across resistor 13 which voltage drop is controlled by the valve 12.

For the purpose of controlling the conductivity of valve 12, its grid to cathode voltage is controlled in accordance with the difference of a reference voltage which is derived from the potentiometer 14 and a variable signal voltage which is produced by means of a tachometer generator 15 which is driven by motor 1. A constant voltage is supplied to the potentiometer from a voltage divider which comprises a resistor 16 and a diode regulator valve 17 connected in series across the source 8—9. This valve has a characteristic such that the voltage across its terminals remains substantially constant at all values of current within its normal operating range. Variations of the voltage of the source are thus absorbed by the resistor 16 and a constant voltage is applied to the master potentiometer 14.

As shown the positive terminal of the tachometer generator 15 is connected to the negative supply conductor 9, and two resistors 18 and 19 constituting a voltage divider are connected between the negative terminal of the tachometer generator and the slider 14a of the potentiometer. With the slider 14a in its lowest position the current conducted by valve 12 is such that the resulting voltage drop across resistor 13 causes both paths of valve 10 to conduct in approximately mid range with the currents in the two paths equal. The two opposing generator field windings 3a and 3b are equally energized and the net excitation of the generator is zero. Consequently the voltage of the generator is zero, and the motor 1 is at standstill. When the slider 14a is in its extreme upper position, the current conducted by valve 12 is large and produces a correspondingly voltage drop across resistor 13. The current conducted by the left-hand path of valve 10 is decreased and the current conducted by the right-hand path is increased to a large value. This results in deenergizing the field winding 3a and increasing the excitation of the field winding 3b to a correspondingly large value, thereby producing a large net excitation of the generator and maximum speed of motor 1. For intermediate positions of the slider, the speed of the motor has corresponding intermediate values.

The generator 6 is also provided with two opposing field windings 6a and 6b of which the excitation is controlled by suitable electric valves 20 and 21 which are preferably identical with the valves 10 and 12 respectively.

In order to maintain a predetermined ratio between the speeds of the motors 1 and 2 the electric valve 21 is controlled in response to the difference of two control voltages which are proportional to the speeds of the two motors. The voltage which is proportional to the speed of motor 1 is produced by a tachometer generator 22 which is driven by the motor 1 and the voltage which is proportional to the speed of motor 2 is produced by a tachometer generator 23 which is driven by motor 2. An armature terminal of one of the tachometer generators is connected to a terminal of opposite polarity of the other. For example, the positive terminal of generator 23 is connected to the negative terminal of generator 22 and these terminals are both connected to the negative supply conductor 9.

In order to adjust the ratio between the speed of the motors to a desired value, means are provided for comparing one of the voltages with a selected fraction of the other. These means comprise a potentiometer 24 connected in series with a fixed resistor 25 across the terminals of the tachometer generator 22 and a potentiometer 26 which is connected in series with a fixed resistor 27 across the terminals of generator 23.

The half of the potentiometer 24 between the terminal 24a and the midtap 24b is a heavy conductor and is therefore of relatively low resistance whereas the lower half 24b–24c of the potentiometer is of relatively high resistance. The upper half 26a–26b of potentiometer 26 is of relatively high resistance and lower half 26b–26c is a heavy conductor and therefore of relatively low resistance. The sliders 24d and 26d of the potentiometers are coupled together to provide for simultaneous operation by a single knob. The initial relative adjustment is such that both sliders are simultaneously at the mid positions.

A voltage divider comprising the two resistors 28 and 29 is connected across the sliders, the control grid of valve 21 is connected to the midpoint of the voltage divider, and the cathode is connected to the negative supply conductor 9 to which the positive terminal of generator 23 and the negative terminal of generator 22 are connected.

As a result of the foregoing connections there is supplied between the grid and cathode of valve 21 a voltage which is proportional to the difference of the voltages selected by the sliders 24d and 26d, i. e., the voltages between the sliders and the negative supply conductor 9.

With the foregoing understanding of the elements and their organization, the operation of the system will readily be understood from the following description:

It is assumed that the motors 5 and 7 are energized and driving the generators 3 and 6. The start push button switch 30 is depressed to complete an energizing circuit for the operating coil of the line contactor 4. In response to energization, the line contactor picks up and closes its contacts 4a, 4b, 4c and 4d. Contacts 4d in closing complete a sealing-in circuit for the contactor in parallel with contacts of the start switch 30, which now may be released. The contacts 4a and 4b complete the loop circuits between the armatures of the generators 3 and 6 and the armatures of the motors 1 and 2 respectively and the motors accelerate to speeds corresponding to the settings of the sliders 14a, 24d and 26d of potentiometers 14, 24 and 26.

With the sliders of potentiometers 24 and 26 in their mid positions, the entire voltage generated by tachometer generator 22 is compared with the entire voltage of tachometer generator 23. The difference of these two voltages effects a net excitation of generator 6 which in turn effects operation of the motor 2 at a speed which results in a balanced condition of the system with the voltage of tachometer generator 23 very nearly equal to the voltage of tachometer generator 22.

If the speed of motor 1 is increased as by rotating the slider 14a to a higher speed position, the speed of motor 2 will increase correspondingly. The entire voltages of the two tachometers are being compared and as a result maximum accuracy of speed regulation is obtained.

If the sliders of potentiometers 24 and 26 are rotated in a clockwise direction, then the entire voltage of tachometer generator 22 is obtained at the slider 24d. However, the slider 26d selects only a portion of the output voltage of tachometer generator 23, and consequently the motor 2 must operate at a higher speed in order to produce the balanced condition in which the voltage selected by the potentiometer arm 26d very nearly equals the voltage at the slider 24d. This means that for a given speed of motor 1, motor 2 operates at a higher speed, i. e., the ratio of the speed of motor 2 to the speed of motor 1 is increased. In bringing about this increase in the ratio the entire voltage obtainable from tachometer generator 22 is utilized. Consequently the maximum accuracy of regulation is obtained.

Similarly, if the sliders of the potentiometers are rotated in the counterclockwise direction from the middle position, the slider 26d selects the entire voltage output of tachometer generator 23 but the slider 24d selects only a portion of the output voltage of tachometer generator 22. The motor must therefore operate a lower speed in order for the system to be in equilibrium and the ratio of the speed of motor 2 to the speed of motor 1 is decreased. In this case the maximum output voltage obtainable from tachometer generator 23 is utilized and maximum accuracy of regulation is obtained.

In the modification of Fig. 2 the motors 31 and 32 are supplied from the generators 33 and 34 respectively. A master reference potentiometer 35 is connected across the D.-C. supply conductors 36 and 37. The field winding 33a of generator 33 is energized by the difference of the voltage at the slider 35a of the master reference potentiometer 35 and the voltage generated by tachometer generator 38 which is driven by motor 31. The motor 31 therefore operates at a speed which corresponds to the position of the slider 35a.

A tachometer generator 39 which is driven by motor 32 generates a voltage proportional to the speed of motor 32. A potentiometer 40 which is identical with the potentiometer 24 of Fig. 1 is connected in series with a fixed resistor 41 across the terminals of tachometer generator 38 and a similar potentiometer 42 is connected in series with a fixed resistor 43 across the terminals of tachometer generator 39. The negative terminals of both tachometer generators are connected to the negative supply conductor 37. The field winding 34a of generator 34 is connected across the sliders 40a and 42a of the potentiometers 40 and 42. With the sliders 40a and 42a in the midpositions in which they are illustrated, the field winding 34a is energized in accordance with the difference of the voltages at the sliders. Consequently the motor 32 operates at a speed at which the system is in equilibrium with the voltage generated by tachometer generator 39 very nearly equal to the voltage of the tachometer generator 38.

If the speed of motor 31 is changed the speed of motor 32 will change in proportion and in the same sense.

Since the entire output voltage of tachometer generators 38 and 39 are compared, the maximum accuracy of regulation is obtained.

If the sliders 40a and 42a are rotated in a clockwise direction from the midposition, the full output voltage of tachometer generator 38 is compared with a selected portion of the output voltage of tachometer generator 39. Consequently the motor 32 must operate at an increased speed in order to maintain the equilibrium of the system. Thus the ratio of the speed of motor 32 to the speed of motor 31 is increased. Since the entire output voltage of the tachometer generator 38 is utilized, the maximum accuracy of regulation is obtained.

Similarly, if the sliders are rotated in a counterclockwise direction from the middle position, the entire output voltage of the tachometer generator 39 is compared with a selected portion of the output voltage of tachometer generator 38. In order to bring about the equilibrium condition of the system, the motor 32 must operate at such a reduced speed that the entire voltage of the tachometer generator 39 very nearly equals the portion of the voltage of tachometer generator 38 which is selected by the slider 40a. Thus, the ratio of the speed of motor 32 to the speed of motor 31 is decreased. Since the entire voltage of tachometer generator 39 is utilized, the maximum accuracy of regulation is obtained.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system for a plurality of electric motors comprising a first tachometer generator driven by one of the motors for producing a voltage proportional to the speed thereof, a second tachometer generator driven by another of the motors for producing a voltage proportional to the speed thereof, means for comparing a selected portion of the voltage of either of said generators with the entire voltage of the other of said generators, and means responsive to the difference of said entire voltage and said selected portion for varying the speed of said second motor to equalize said selected portion with said entire voltage.

2. A control system for a plurality of electric motors comprising a first tachometer generator driven by one of the motors for producing a voltage proportional to the speed thereof, a second tachometer generator driven by another of the motors for producing a voltage proportional to the speed thereof, a first potentiometer connected across the terminals of one of said generators, a second potentiometer connected across the terminals of the other of said generators, means for comparing a selected portion of the voltage of either of said potentiometers with the entire voltage of the other, and means responsive to the difference of said entire voltage and said selected portion for varying the speed of said second motor to equalize said selected portion with said entire voltage.

3. A control system for a plurality of electric motors comprising, a tachometer generator driven by a first of said motors for producing a signal voltage proportional to the speed of said first motor, a second tachometer generator driven by a second of said motors for producing a second signal voltage proportional to the speed of said second motor, a first potentiometer connected across the terminals of said first generator, a second potentiometer connected across the terminals of said second generator, each of said potentiometers having a high resistance portion and a relatively low resistance portion and each being provided with a slider, means for moving said sliders to select the entire voltage of either of said potentiometers and a portion of the voltage of the other of said potentiometers, and means responsive to the difference of said entire voltage and said selected portion for varying the speed of said second motor to equalize said selected portion with said entire voltage.

4. A control system for a plurality of electric motors comprising, a tachometer generator driven by a first of said motors for producing a signal voltage proportional to the speed of said first motor, a second tachometer generator driven by a second of said motors for producing a second signal voltage proportional to the speed of said second motor, a first potentiometer connected across the terminals of said first generator, a second potentiometer connected across the terminals of said second generator, each of said potentiometers having a high resistance portion and a relatively low resistance portion and each being provided with a slider, means for simultaneously moving either of said sliders in contact with the low resistance portion of its potentiometer and the other of said sliders in contact with the high resistance portion of its potentiometer to select the entire voltage of each potentiometer and a portion of the voltage of the other potentiometer, and means responsive to the difference of said entire voltage and said selected portion for varying the speed of said second motor to equalize said selected portion with said entire voltage.

5. A control system for a plurality of electric motors comprising a first tachometer generator driven by a first of the motors for producing a voltage proportional to the speed thereof, a second tachometer generator driven by a second of the motors for producing a voltage proportional to the speed thereof, a connection from one terminal of one of said generators to a terminal of the other of said generators, a first potentiometer connected across the terminals of one of said generators, a second potentiometer connected across the terminals of said second generator, each of said potentiometers having a relatively high and a relatively low resistance portion and each being provided with a slider, means for moving said sliders to select the entire voltage of either of said potentiometers and a portion of the voltage of the other of said potentiometers, and means responsive to the difference of said entire voltage and said selected portion for varying the speed of said second motor to equalize said selected portion with said entire voltage.

6. A control system for a plurality of electric motors comprising a first tachometer generator driven by a first of the motors for producing a voltage proportional to the speed thereof, a second tachometer generator driven by a second of the motors for producing a voltage proportional to the speed thereof, a connection from one terminal of one of said generators to a terminal of the other of said generators, a first potentiometer connected across the terminals of one of said generators, a second potentiometer connected across the terminals of said second generator, each of said potentiometers having a relatively high and a relatively low resistance portion and each being provided with a slider, means for moving said sliders to select the entire voltage of either of said potentiometers and a portion of the voltage of the other of said potentiometers, a voltage divider connected across said sliders, and means responsive to the difference of said entire voltage and said selected portion comprising an electric valve having its cathode connected to said connection between said generator terminals and having its grid connected to an intermediate point on said voltage divider for controlling the speed of said second motor to equalize said selected portion with said entire voltage.

7. A control system for a plurality of motors comprising a first variable voltage generator for supplying a first motor, a second variable voltage generator for supplying a second motor, a source of reference voltage, a tachometer generator driven by the first motor for producing a voltage proportional to the speed thereof, said first generator being provided with a field winding connected to be excited in response to the difference of said reference voltage and the voltage of said tachometer generator for effecting operation of said first motor at a speed corresponding to said reference voltage, a second tachometer generator driven by said second motor for producing a voltage proportional to the speed thereof, a first potentiometer connected across the terminals of said first tachometer generator, a second potentiometer connected across the terminals of said second tachometer generator, each of said potentiometers having a relatively high resistance and a relatively low resistance portion and each being provided with a slider, means for moving said sliders to select all of the voltage of either of said potentiometers and a portion of the voltage of the other, and a field winding on said second supply generator excited by the difference of said entire voltage and said selected portion for varying the speed of said second motor to equalize said selected portion with said entire voltage.

ROBERT D. McCOMB.